(12) United States Patent
Shillingford et al.

(10) Patent No.: US 11,386,900 B2
(45) Date of Patent: Jul. 12, 2022

(54) VISUAL SPEECH RECOGNITION BY PHONEME PREDICTION

(71) Applicant: DeepMind Technologies Limited, London (GB)

(72) Inventors: Brendan Shillingford, London (GB); Ioannis Alexandros Assael, London (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 17/043,846

(22) PCT Filed: May 20, 2019

(86) PCT No.: PCT/EP2019/062942
§ 371 (c)(1),
(2) Date: Sep. 30, 2020

(87) PCT Pub. No.: WO2019/219968
PCT Pub. Date: Nov. 21, 2019

(65) Prior Publication Data
US 2021/0110831 A1   Apr. 15, 2021

Related U.S. Application Data

(60) Provisional application No. 62/673,770, filed on May 18, 2018.

(51) Int. Cl.
*G10L 15/00* (2013.01)
*G10L 15/25* (2013.01)
(Continued)

(52) U.S. Cl.
CPC ........... *G10L 15/25* (2013.01); *G06K 9/6217* (2013.01); *G06N 3/08* (2013.01); *G06T 7/0002* (2013.01);
(Continued)

(58) Field of Classification Search
CPC ......... G10L 15/00; G10L 11/00; G10L 21/00; G10L 25/00
See application file for complete search history.

(56) References Cited

U.S. PATENT DOCUMENTS 6,076,039 A * 6/2000 Kabel .................... G01C 21/20
340/988
6,539,354 B1 * 3/2003 Sutton .................... G10L 21/06
704/E21.02
(Continued)

FOREIGN PATENT DOCUMENTS

JP        3710205 B2 * 10/2005 ............. G10L 15/24

OTHER PUBLICATIONS

Torfi et al.; "3D Convolutional Neural Networks for Cross Audio-Visual Matching Recognition"; Aug. 18, 2017; IEEE Access; vol. 5; pp. 22081-22091 (Year: 2017).*
(Continued)

*Primary Examiner* — Shreyans A Patel
(74) *Attorney, Agent, or Firm* — Fish & Richardson P.C.

(57) ABSTRACT

Methods, systems, and apparatus, including computer programs encoded on a computer storage medium, for performing visual speech recognition. In one aspect, a method comprises receiving a video comprising a plurality of video frames, wherein each video frame depicts a pair of lips; processing the video using a visual speech recognition neural network to generate, for each output position in an output sequence, a respective output score for each token in a vocabulary of possible tokens, wherein the visual speech
(Continued)

recognition neural network comprises one or more volumetric convolutional neural network layers and one or more time-aggregation neural network layers; wherein the vocabulary of possible tokens comprises a plurality of phonemes; and determining a sequence of words expressed by the pair of lips depicted in the video using the output scores.

20 Claims, 6 Drawing Sheets

(51) Int. Cl.
  *G06K 9/62* (2022.01)
  *G06N 3/08* (2006.01)
  *G06T 7/00* (2017.01)
  *G10L 15/02* (2006.01)
  *G10L 15/16* (2006.01)
  *G10L 15/197* (2013.01)
  *G06V 20/40* (2022.01)
  *G06V 40/20* (2022.01)
  *G06V 40/16* (2022.01)

(52) U.S. Cl.
  CPC ............ *G06V 20/40* (2022.01); *G06V 40/171* (2022.01); *G06V 40/20* (2022.01); *G10L 15/02* (2013.01); *G10L 15/16* (2013.01); *G10L 15/197* (2013.01); *G06T 2207/10016* (2013.01); *G06T 2207/30168* (2013.01); *G06T 2207/30201* (2013.01); *G10L 2015/025* (2013.01)

(56) References Cited

U.S. PATENT DOCUMENTS

| | | | | |
|---|---|---|---|---|
| 9,741,342 | B2* | 8/2017 | Takayanagi | G10L 15/25 |
| 9,807,473 | B2 | 10/2017 | Mei et al. | |
| 10,970,520 | B1* | 4/2021 | Kim | G06T 3/60 |
| 2003/0018475 | A1* | 1/2003 | Basu | G10L 15/25 |
| | | | | 704/270 |
| 2006/0224382 | A1* | 10/2006 | Taneda | G10L 21/0208 |
| | | | | 704/233 |
| 2010/0332229 | A1* | 12/2010 | Aoyama | G06K 9/00221 |
| | | | | 704/251 |
| 2011/0131041 | A1* | 6/2011 | Cortez | G10L 15/25 |
| | | | | 704/235 |
| 2011/0227931 | A1* | 9/2011 | Lu | G06T 13/205 |
| | | | | 345/473 |
| 2011/0311144 | A1* | 12/2011 | Tardif | G10L 15/25 |
| | | | | 382/195 |
| 2013/0065205 | A1* | 3/2013 | Park | G06T 13/40 |
| | | | | 434/157 |
| 2015/0279364 | A1* | 10/2015 | Krishnan | G10L 15/25 |
| | | | | 704/251 |
| 2015/0324168 | A1* | 11/2015 | Suzuki | G06F 3/0482 |
| | | | | 345/156 |
| 2016/0098986 | A1* | 4/2016 | Hofer | G10L 15/083 |
| | | | | 704/243 |
| 2016/0350649 | A1* | 12/2016 | Zhang | G06N 3/0454 |
| 2017/0040017 | A1* | 2/2017 | Matthews | G10L 25/57 |
| 2018/0129795 | A1* | 5/2018 | Katz-Oz | G10L 15/005 |
| 2018/0158450 | A1* | 6/2018 | Tokiwa | G10L 25/57 |
| 2018/0191695 | A1* | 7/2018 | Lindemann | H04L 63/0853 |
| 2018/0308276 | A1* | 10/2018 | Cohen | G06T 13/40 |
| 2018/0310159 | A1* | 10/2018 | Katz | H04M 3/4217 |
| 2019/0130628 | A1* | 5/2019 | Cao | H04L 51/10 |

OTHER PUBLICATIONS

Afouras et al., "The conversation: Deep audio-visual speech enhancement," CoRR, Apr. 2018, arXiv:1804.04121, 5 pages.

Akbari et al., "Lip2AudSpec: Speech reconstruction from silent lip movements video." 2018 IEEE International Conference on Acoustics, Speech and Signal Processing, Apr. 2018. 9 pages.

Almajai et al.. "Improved speaker independent lip reading using speaker adaptive training and deep neural networks," 2016 IEEE International Conference on Acoustics, Speech and Signal Processing, Mar. 2016, pp. 2722-2726.

Amodei et al., "Deep speech 2: End-to-end speech recognition in english and mandarin," Proceedings of The 33rd International Conference on Machine Learning, 2016, 48:173-182.

Assael et al., "LipNet: End-to-end sentence-level lip-reading," CoRR, Nov. 2016, arxiv.org/abs/1611.01599, 13 pages.

Chambers et al., "Flumejava: easy, efficient data-parallel pipelines," Sigplan Notices, Jun. 2010, 45(6)363-375.

Chu et al., "Bimodal speech recognition using coupled hidden Markov models." Sixth International Conference on Spoken Language Processing, Oct. 2000, 4 pages.

Chung et al., "Lip reading in profile," Oxford University Research Archive, 2017, 11 pages.

Chung et al., "Lip reading in the wild," Asian Conference on Computer Vision, 2016, 17 pages.

Chung et al., "Lip Reading Sentences in the Wild," 2017 IEEE Conference on Computer Vision and Pattern Recognition, Jul. 2017, pp. 3444-3450.

Chung et al.. "Out of time: Automated lip sync in the wild." Computer Vision—ACCV 2016 Workshops, 2016, 10117:13 pages.

Cooke et al., "An audio-visual corpus for speech perception and automatic speech recognition," The Journal of the Acoustical Society of America, Oct. 2006, 120(5):2421-2424.

Cornu et al., "Generating intelligible audio speech from visual speech," IEEE Transactions on Audio, Speech, and Language Processing, Sep. 2017, 25(9):1751-1761.

Davis et al., "The visual microphone: Passive recovery of sound from video," ACM Transactions on Graphics, Jul. 2014, 33(4, article 79):10 pages.

Donahue et al., "Long-Term Recurrent Convolutional Networks for Visual Recognition and Description," Proceedings of the IEEE Conference on Computer Vision and Pattern Recognition, 2015, pp. 2625-2634.

Doukas, "Deep Lip-reading," Submitted in partial fulfillment of the requirements for the MSc degree in Computing Science, Machine Learning of Imperial College London, Sep. 2017, 85 pages.

Ephrat et al., "Looking to listen at the cocktail party: A speaker independent audio-visual model for speech separation," CoRR, Apr. 2018, arXiv:1804,03619, 11 pages.

Ephrat et al., "Vid2speech: Speech reconstruction from silent video," 2017 IEEE International Conference on Acoustics, Speech and Signal Processing, Mar. 2017, 5 pages.

Fernandez-Lopez et al., "Survey on automatic lip-reading in the era of deep learning," Image and Vision Computing, Jul. 2018, 78:53-72.

Gabbay et al., "Visual speech enhancement using noise-invariant training," CoRR, Nov. 2017, arxiv.org/abs/1711.08789, 5 pages.

Gergen et al., "Dynamic stream weighting for turbo decoding-based audiovisual ASR," Interspeech, Sep. 2016, pp. 2135-2139.

Github.com [online], "Compact Language Detector v3 (CLD3)," Aug. 27. 2020. retrieved on Jan. 8, 2021, retrieved from URL<https://github.com/google/cld3#model>, 8 pages.

Goldschen et al., "Continuous automatic speech recognition by lip-reading," Motion-Based Recognition, 1997, 9:321-343.

Graves et al.. "Connectionist temporal classification: Labeling unsegmented sequence data with recurrent neural networks," ICML, 2006, pp. 369-376.

Graves, "Sequence transduction with recurrent neural networks," CoRR, Nov. 2012, arxiv.org/abs/121I.3711, 9 pages.

Gray et al., "Dynamic features for visual speechreading: A systematic comparison," Advances in Neural Information Processing Systems, pp. 751-753.

Gurban et al., "Information theoretic feature extraction for audio-visual speech recognition," IEEE Transactions on Signal Processing, Dec. 2009, 57(12):4765-4776.

(56) References Cited

OTHER PUBLICATIONS

Hinton et al., "Deep neural networks for acoustic modeling in speech recognition: The shared views of four research groups," IEEE Signal Processing Magazine, Nov. 2012, 29(6):82-97.
Hochreiter et al., "Long short-term memory," Neural Computation, Nov. 1997, 9(8): 1735-1780.
Iwano et al., "Audio-visual speech recognition using lip movement extracted from side-face images," EURASIP Journal on Audio, Speech, and Music Processing, Dec. 2007, pp. 1-9.
Kingma et al., "Adam: A method for stochastic optimization," CoRR, Dec. 2014, arXiv:1412,6980, 15 pages.
Koller et al., "Deep learning of mouth shapes for sign language," Proceedings of the IEEE International Conference on Computer Vision, 2015, pp. 85-91.
Koumparoulis et al., "Exploring ROI size in deep learning based lip-reading," International Conference on Auditory-Visual Speech Processing, 2017, 6 pages.
Kuznetsov et al., "Learning n-gram language models from uncertain data," Interspeech, 2016, 5 pages.
Liao et al., "Large scale deep neural network acoustic modeling with semi supervised training data for YouTube video transcription," 2013 IEEE Workshop on Automatic Speech Recognition and Understanding, Dec. 2013, 6 pages.
Liao et al., "Large vocabulary automatic speech recognition for children," Interspeech, 2015, 5 pages.
Lucey et al., "Patch-based representation of visual speech," Proceedings HCSNet Workshop on the Use of Vision in Human-Computer Interaction, 2006, pp. 79-85.
Mas et al., "Video shot boundary detection based on color histogram," TRECVID, Oct. 2003, 11 pages.
Mase et al., "Automatic lip-reading by optical-flow analysis," Systems and Computers in Japan, 1991, 22(6):67-76.
Matthews et al., "Extraction of visual features for lip-reading," IEEE Transactions on Pattern Analysis and Machine Intelligence, Aug. 2002, 24(2):198-213.
McGraw et al., "Personalized speech recognition on mobile devices," 2016 IEEE International Conference on Acoustics, Speech and Signal Processing, Mar. 2016, 5 pages.
Miao et al., "Eesen: End-to-end speech recognition using deep RNN models and WFST-based decoding," Workshop on Automatic Speech Recognition and Understanding, Dec. 2015, 8 pages.
Mohri et al., "Weighted finite-state transducers in speech recognition," Computer Speech & Language, Jan. 2002, 16(1):69-88.
Morris et al., "Silence in the EHR: Infrequent documentation of aphonia in the electronic health record," BMC Health Services Research, Sep. 2014, 14(425):5 pages.
Neti et al., "Audio visual speech recognition," IDIAP, Technical Report, 2000, 86 pages.
Ngiam et al., "Multimodal deep learning," Proceedings of the 28th International Conference on Machine Learning, 2011, 8 pages.
Ninomiya et al., "Integration of deep bottleneck features for audio-visual speech recognition," 16th Annual Conference of the International Speech Communication Association, Sep. 2015, 5 pages.
Noda et al., "Lip-reading using convolutional neural network," 15th Annual Conference of the International Speech Communication Association, Sep. 2014, pp. 1149-1153.
Palecek et al., "Utilizing Lip-reading in large vocabulary continuous speech recognition," Speech and Computer, Aug. 2017, pp. 767-776.
Papandreou et al., "Adaptive multimodal fusion by uncertainty compensation with application to audiovisual speech recognition," IEEE Transactions on Audio, Speech, and Language Processing, Mar. 2009, 17(3):423-435.
Papandreou et al., "Multimodal fusion and learning with uncertain features applied to audiovisual speech recognition," 2007 IEEE 9th Workshop on Multimedia Signal Processing, Oct. 2007, pp. 264-267.
PCT International Preliminary Report on Patentability in International Appln. No. PCT/EP2019/062942, dated Nov. 24, 2020, 11 pages.

PCT International Search Report and Written Opinion International Appln. No. PCT/EP2019/062942, dated Aug. 5, 2019, 19 pages.
Pech-Pacheco et al., "Diatom autofocusing in brightfield microscopy: A comparative study," Proceedings 15th International Conference on Pattern Recognition, Sep. 2000, 3:314-317.
Petridis et al., "Deep complementary bottleneck features for visual speech recognition," 2016 IEEE International Conference on Acoustics, Speech, and Signal Processing, Mar. 2016, pp. 2304-2308.
Petridis et al., "End-to-end multi-view Lip-reading," CoRR, Sep. 2017, arxiv.org/pdf/1709.00443.pdf, 14 pages.
Pitsikalis et al., "Adaptive multimodal fusion by uncertainty compensation," Ninth International Conference on Spoken Language Processing, Sep. 2006, pp. 2458-2461.
Potamianos et al., "Audio-visual automatic speech recognition: An overview," Issues in Visual and Audio-Visual Speech Processing, 2004, 39 pages.
Prabhavalkar et al., "A comparison of sequence-to-sequence models for speech recognition," Interspeech, 2017, Aug. 2017, pp. 939-943.
Rao et al., "Exploring architectures, data and units for streaming end-to-end speech recognition with RNN-transducer," 2017 IEEE Automatic Speech Recognition and Understanding Workshop, Dec. 2017, 7 pages.
Rosenbaum et al., "Learning models for visual 3D localization with implicit mapping," CoRR, Jul. 2018, arxiv.org/abs/1807.03149, 14 pages.
Schrof et al., "Facenet: A unified embedding for face recognition and clustering," Proceedings of the IEEE Conference on Computer Vision and Pattern Recognition, 2015, pp. 815-823.
Shaikh et al., "Lip reading using optical flow and support vector machines," 2010 3rd International Congress on Image and Signal Processing, Nov. 2012, 1:327-330.
Shillingford et al., "Large-Scale Visual Speech Recognition," CoRR, Jul. 2018, arxiv.org/abs/1807.05162, 21 pages.
Simonyan et al., "Very deep convolutional networks for large-scale image recognition," CoRR, Sep. 2014, arxiv.org/abs/1409.1556, 14 pages.
Soltau et al., "Neural speech recognizer: Acoustic-to-word LSTM model for large vocabulary speech recognition," CoRR, Oct. 2016, arxiv.org/abs/1610.09975, 6 pages.
Springenberg et al., "Striving for simplicity: The all convolutional net," CoRR, Dec. 2014, arxiv.org/abs/1412.6806, 14 pages.
Stafylakis et al., "Combining residual networks with LSTMs for Lip-reading," CoRR, Mar. 2017, arxiv.org/abs/1703.04105, 5 pages.
Sui et al., "Listening with your eyes: Towards a practical visual speech recognition system using deep Boltzmann machines," Proceedings of the IEEE International Conference on Computer Vision, 2015, pp. 154-162.
Takashima et al., "Audio visual speech recognition using bimodal-trained bottleneck features for a person with severe hearing loss," Interspeech, Sep. 2016, pp. 277-281.
Tamura et al., "Multi-modal speech recognition using optical-flow analysis for lip images," Real World Speech Processing, 2004, pp. 43-50.
Thanda et al., "Audio visual speech recognition using deep recurrent neural networks," Multimodal Pattern Recognition of Social Signals in Human-Computer-Interaction, Jun. 2017, 12 pages.
Torfi et al., "3D convolutional neural networks for cross audio-visual matching recognition," IEEE Access, Oct. 2017, 5:22081-22091.
Townsend, "Decoding visemes: Improving machine lip-reading," Thesis for the degree of Doctor, University of East Anglia, School of Computing Sciences, Jul. 2016, 159 pages.
Wand et al., "Improving speaker-independent Lip-reading with domain-adversarial training," CoRR. Aug. 2017, arxiv.org/abs/1708.01565, 5 pages.
Wand et al., "Lip-reading with long short-term memory," 2016 IEEE International Conference on Acoustics, Speech, and Signal Processing, 2016, 5 pages.
Wang et al., "An automatic Lip-reading system for spoken digits with limited training data," IEEE Transactions on Circuits and Systems for Video Technology, Sep. 2008, 18(12):1760-1765.
Well, "Computer-coding the IPA: A proposed extension of SAMPA," Revised Draft, Apr. 1995, 4(28):18 pages.

(56) References Cited

OTHER PUBLICATIONS

Wu et al., "Group normalization," Proceedings of the European Conference on Computer Vision, 2018, 17 pages.

Xu et al., "CANet: End-to-End Lip-reading with Cascaded Attention-CTC," 2018 13th IEEE International Conference on Automatic Face & Gesture Recognition, May 2018, pp. 548-555.

Xu et al., "LCANet: End-to-end Lip-reading with cascaded attention-cte," 2018 13th IEEE International Conference on Automatic Face & Gesture Recognition, May 2018, 10 pages.

Zhao et al., "Lip-reading with local spatiotemporal descriptors," IEEE Transactions on Multimedia, Nov. 2009, 11(7):1254-1265.

Zhou et al., "A review of recent advances in visual speech decoding," Image and Vision Computing, Sep. 2014, 32(9):590-605.

* cited by examiner

| Layer | Filter size | Stride | Output channels | Input |
|---|---|---|---|---|
| conv1 | $3 \times 3 \times 3$ | $1 \times 2 \times 2$ | 64 | $T \times 128 \times 128 \times 3$ |
| pool1 | $1 \times 2 \times 2$ | $1 \times 2 \times 2$ | | $T \times 63 \times 63 \times 64$ |
| conv2 | $3 \times 3 \times 3$ | $1 \times 1 \times 1$ | 128 | $T \times 31 \times 31 \times 64$ |
| pool2 | $1 \times 2 \times 2$ | $1 \times 2 \times 2$ | | $T \times 29 \times 29 \times 128$ |
| conv3 | $3 \times 3 \times 3$ | $1 \times 1 \times 1$ | 256 | $T \times 14 \times 14 \times 128$ |
| pool3 | $1 \times 2 \times 2$ | $1 \times 2 \times 2$ | | $T \times 12 \times 12 \times 256$ |
| conv4 | $3 \times 3 \times 3$ | $1 \times 1 \times 1$ | 512 | $T \times 6 \times 6 \times 256$ |
| conv5 | $3 \times 3 \times 3$ | $1 \times 1 \times 1$ | 512 | $T \times 4 \times 4 \times 512$ |
| pool5 | $1 \times 2 \times 2$ | $1 \times 1 \times 1$ | | $T \times 2 \times 2 \times 512$ |
| bilstm6 | | | $768 \times 2$ | $T \times 512$ |
| bilstm7 | | | $768 \times 2$ | $T \times 1536$ |
| bilstm8 | | | $768 \times 2$ | $T \times 1536$ |
| fc9 | | | 768 | $T \times 1536$ |
| fc10 | | | $41 + 1$ | $T \times 768$ |

FIG. 3

(a) Transcript: "sharing" - ground truth phonemes: /S E r\@ N/.

VISUAL SPEECH RECOGNITION BY PHONEME PREDICTION

This application is a National Stage Application under 35 U.S.C. § 371 and claims the benefit of International Application No. PCT/EP2019/062942, filed May 20, 2019, which claims priority to U.S. Application No. 62/673,770, filed May 18, 2018, the disclosure of which is incorporated herein by reference.

BACKGROUND

This specification relates to visual speech recognition.

Visual speech recognition refers to processing a sequence of video frames that depict the lips of a person to predict a sequence of words being spoken by the person based on the movement of the lips in the video frames.

Visual speech recognition can be performed by machine learning models, e.g., neural network models.

SUMMARY

This specification describes a system implemented as computer programs on one or more computers in one or more locations that performs visual speech recognition.

According to a first aspect there is provided a method, and a corresponding system, for visual speech recognition. The method/system comprises receiving a video comprising a plurality of video frames, wherein each video frame depicts a pair of lips (of a particular person). The method/system further comprises processing the video using a visual speech recognition neural network in accordance with current values of visual speech recognition neural network parameters to generate, for each output position in an output sequence, a respective output score for each token in a vocabulary of possible tokens. The visual speech recognition neural network comprises one or more volumetric convolutional neural network layers and one or more time-aggregation neural network layers. The vocabulary of possible tokens may comprise a plurality of phonemes. The method/system may further comprise determining an utterance (phoneme) expressed by the pair of lips of the particular person depicted in the video using the output scores and/or determining a sequence of words expressed by the pair of lips depicted in the video using the output scores.

In implementations determining the sequence of words may comprise predicting a sequence of phoneme distributions (implicitly determining the utterance i.e. phoneme expressed by the pair of lips), and providing the sequence of phoneme distributions to a decoder to produce the sequence of words.

Implementations of the system/method can provide significantly improved accuracy of visual speech recognition, and are readily adaptable to different applications without retraining. Further advantages are described later. An output of the method/system may comprises data defining the sequence of words, e.g. text data, and/or the words may be converted to audible speech, e.g. using a text-to-speech system to provide speech data.

In some implementations the volumetric convolutional neural network layers include a plurality of three-dimensional (convolutional) filters i.e. filters with a kernels operating over two spatial dimensions and a time dimension. This can help to capture the spatiotemporal relationships present when lips form a phoneme. In some implementations the visual speech recognition neural network includes at least five volumetric convolutional neural network layers.

In some implementations the time-aggregation neural network layers comprise one or more recurrent neural network layers, in particular one or more long short-term memory neural network layers, more particularly bi-directional long short-term memory neural network layers. These can work with the 3D convolutional layers in aggregating over longer time periods.

In some implementations the visual speech recognition neural network comprises one or more group normalization layers, e.g. interleaved between the volumetric convolutional neural network layers and/or the time-aggregation neural network layers. Such a group normalization layer may normalize over a group of (filter) channels. This can facilitate distributing the computation across multiple processing units by reducing communication between the units compared with e.g. batch normalization, and can also help to provide more stable learning during training.

As previously described, in some implementations determining the utterance or sequence of words expressed by the pair of lips depicted in the video using the output scores comprises processing the outputs scores using a decoder to generate the sequence of words. The decoder may comprise a so-called finite state transducer (FST). In implementations the decoder may perform operations comprising removing duplicate phonemes and blanks and/or mapping phonemes to words, in particular using an n-gram language model e.g. with backoff such as Katz's backoff.

In another aspect there is provided a method of training a visual speech recognition neural network as described above, i.e. comprising one or more volumetric convolutional neural network layers and one or more time-aggregation neural network layers. The method may comprise generating training data comprising a plurality of training examples, each training example comprising: (i) a training video comprising a plurality of training video frames, and (ii) a sequence of phonemes from a vocabulary of possible phonemes. The generating may comprise, for each training video: obtaining a raw video comprising a plurality of raw video frames and corresponding audio data, determining the sequence of phonemes from the vocabulary of possible phonemes using the audio data, and determining each training video frame based on (i.e. so that it represents) a face depicted in a respective raw video frame. The method may thus comprise training the visual speech recognition neural network on the generated training data by determining trained values of visual speech recognition neural network parameters from initial values of visual speech recognition neural network parameters.

Such a method can generate large quantities of training data by an automated process and then use the generated training data to improve the performance of the visual speech recognition neural network. For example the training data may be generated from publically available videos such as YouTube videos.

In implementations, determining the sequence of phonemes from the vocabulary of possible phonemes using the audio data may comprise obtaining a transcript of the raw video, determining an alignment of the transcript and the audio data using a trained automatic speech recognition algorithm, and determining the sequence of phonemes from the aligned transcript. The method may further comprise determining the transcript is expressed in a specific natural language and/or determining that a quality measure of the raw video exceeds a minimum threshold.

The method of training may employ video processing steps as described below; some or all of these steps may also be applied to the video received by the previously described method/system for visual speech recognition.

Thus in implementations determining a training video frame based on a face depicted in a respective raw video frame may comprises detecting the face in the raw video frame; determining a plurality of landmarks on the face; determining a canonical (i.e. standardized) view of the face using the landmarks; and cropping a region depicting a pair of lips from the canonical view of the face. The method may further comprise smoothing, e.g. filtering/averaging over time and/or space, positions of the plurality of landmarks on the face. This can help to achieve good performance.

The video processing may further comprise determining that an orientation of the face is within an acceptable range of possible orientations using the landmarks on the face and/or determining that the lips are expressing an utterance based on i.e. dependent upon a variation in i.e. dispersion of, a measure of mouth openness between e.g. raw video frames.

Implementations may further comprise determining that the raw video and the corresponding audio data are aligned, e.g. by generating an embedding of the audio data by processing the audio data using an audio data embedding neural network, generating an embedding of the raw video by processing the raw video using a video embedding neural network, and determining that a similarity measure between the embedding of the audio data and the embedding of the raw video exceeds a threshold. The video embedding neural network may include one or more volumetric convolutional neural network layers.

In implementations training the visual speech recognition neural network on the generated training data may comprise, for each of a plurality of training examples: processing the training video included in the training example using the visual speech recognition neural network in accordance with current values of visual speech recognition neural network parameters to generate, for each output position in an output sequence, a respective output score for each phonemes in the vocabulary of possible phonemes; determining a gradient of a connectionist temporal classification (CTC) loss function based on the output scores and the sequence of phonemes from the vocabulary of possible phonemes included in the training example; and adjusting the current values of the visual speech recognition neural network parameters using the gradient. The CTC loss function may measure the likelihood of the sequence of phonemes based on a sequence of phoneme distributions without requiring the alignment of the sequence of phonemes and the sequence of phoneme distributions.

Particular embodiments of the subject matter described in this specification can be implemented so as to realize one or more of the following advantages.

The system described in this specification can perform visual speech recognition (VSR) more accurately than some professional lip readers and some conventional systems. For example, the system described in this specification can achieve a word error rate of 40.9% when performing VSR on a set of video frames. In comparison, professional lip readers can achieve a word error rate of 92.9% on the same dataset, and some conventional VSR systems achieve word error rates of greater than 75%, on the same set of video frames.

The system described in this specification decouples phoneme prediction and word decoding by using a VSR neural network to predict phonemes, and then using word decoding to predict the words corresponding to the phonemes. In contrast, some conventional systems use a VSR neural network to directly predict characters or words (i.e., without the intermediate word decoding step). Decoupling phoneme prediction and word decoding enables the system described in this specification to realize a number of advantages.

For example, decoupling phoneme prediction and word decoding enables the vocabulary of words that can be predicted by the system to be arbitrarily extended (i.e., scaled) or reduced without retraining the VSR neural network. This may be achieved, for example, by changing a vocabulary or language model used by the decoder.

As another example, decoupling phoneme prediction and word decoding can reduce the uncertainty that the VSR neural network has to model, thereby enabling the VSR neural network to be trained more effectively, e.g., to achieve a higher prediction accuracy over fewer training iterations. More specifically, uncertainty in VSR can originate from two main sources: uncertainty in the sounds that correspond to lip movements (e.g., due to similar lip movements corresponding to different sounds), and uncertainty in the words that correspond to these sounds (e.g., due to the same sounds corresponding to different words). Uncertainty in the words that correspond to sounds can be illustrated by the words "fair" and "fare": these are different words that are pronounced in the same way. By decoupling phoneme prediction and word decoding, the VSR neural network only has to model the uncertainty in the sounds that correspond to lip movements, while the uncertainty in the words that correspond to the sounds is modeled by a separate word decoding procedure.

The system described in this specification can be used to assist people who are able to move their lips but have difficulty in clearly pronouncing words, e.g., following surgery or injury. In one example, the system can be used to process video frames that depict the lips of a person with a speech impairment to generate a sequence of words corresponding to the lip movements of the person. The sequence of words can thereafter be verbalized by another automated system. In this manner, the system described in this specification can be used to enable people having speech impairments to communicate or communicate more clearly. The system may also be used by people who are paralyzed but nonetheless able to move their lips, to enable them to speak.

The system described in this specification can also be used by a user device (e.g., a mobile phone, computer, or digital assistant) to enable a user to interact with the device by silently mouthing commands specifying operations to be performed by the user device. A user may wish to interact with a device by silently mouthing commands if the user is in a quiet environment, e.g., a library.

It will be appreciated that there are many other applications, e.g. for deaf people and noisy environments.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example of the filter sizes, strides, and input and output dimensionalities of the neural network layers in the example architecture of the visual speech recognition neural network.

Like reference numbers and designations in the various drawings indicate like elements.

DETAILED DESCRIPTION

Figure 1:
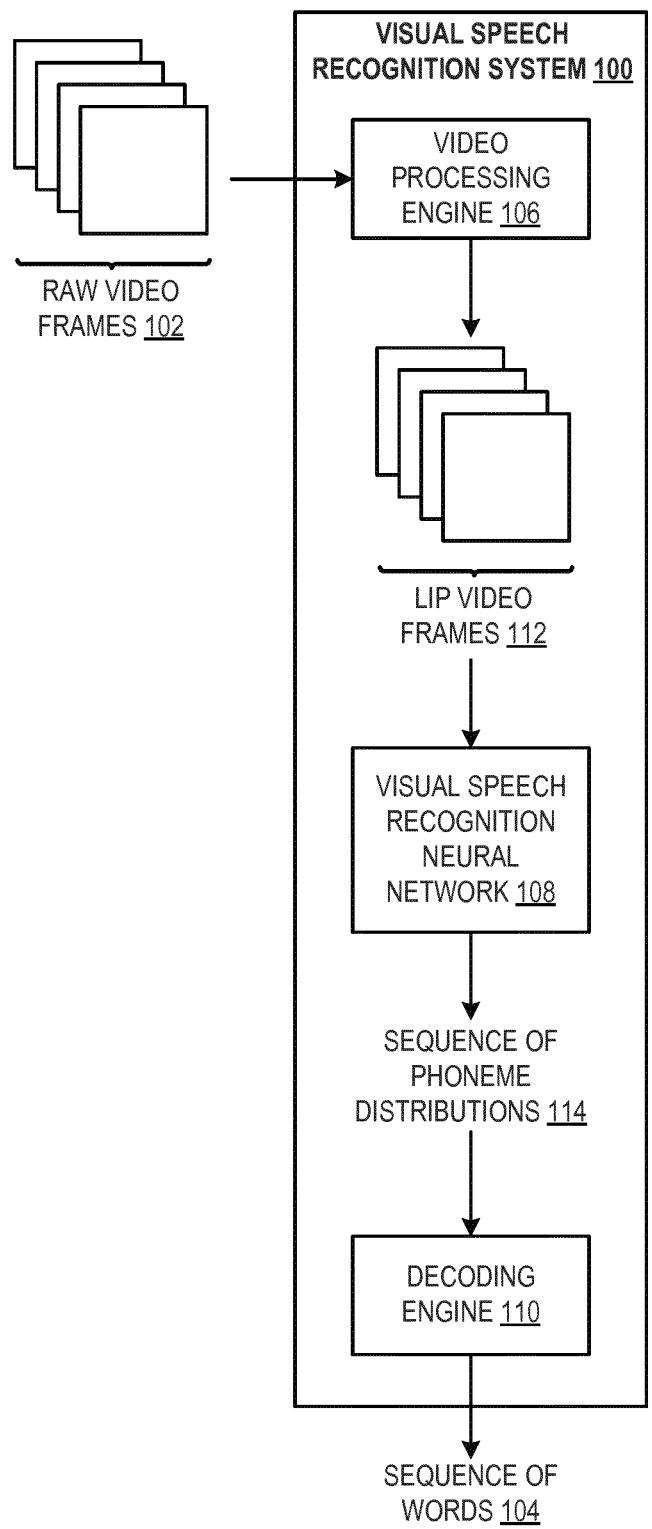
FIG. 1 shows an example visual speech recognition system.

FIG. 1 shows an example visual speech recognition system 100. The visual speech recognition system 100 is an example of a system implemented as computer programs on one or more computers in one or more locations in which the systems, components, and techniques described below are implemented.

The visual speech recognition system 100 is configured to process a sequence of multiple "raw" video frames 102 that depict the lips of a person to generate data defining a sequence of words 104 being spoken by the person. The system 100 can be understood to perform lip reading by identifying words being spoken by the person based on the movement of the lips of the person in the raw video frames 102.

In addition to depicting the lips of the person, each raw video frame 102 may additionally depict other content in a scene, e.g., the whole face of the person, some or all of the body of the person, the environment (e.g., room) where the person is located, and one or more other people.

The raw video frames 102 can be represented in any appropriate format. For example, each raw video frame 102 can be represented by a respective set of one or more "channels", where each channel is represented by a two-dimensional array of numerical values (e.g., floating point values). In one example, the raw video frames 102 may be black-and-white video frames, and each raw video frame 102 may be represented by a respective grayscale intensity channel. In another example, the raw video frames 102 may be color video frames, and each raw video frame 102 may be represented by a respective set of red, green, and blue (i.e., RGB) color channels.

The system 100 may include: (i) a video processing engine 106, (ii) a visual speech recognition neural network 108 (referred to in this specification as a "VSR network"), and (iii) a decoding engine 110.

The video processing engine 106 may be configured to process the raw video frames 102 to generate a corresponding sequence of "lip" video frames 112 that depict the lips of the person from a canonical (i.e., standardized) point of view.

To generate a lip video frame 112 from a raw video frame 102, the video processing engine 106 determines the position of the face of the person in the raw video frame 102. For example, the video processing engine 106 may determine the position of the face by processing the raw video frame 102 using a face detection neural network to generate data defining a bounding box enclosing the face of the person in the raw video frame 102.

After determining the position of the face in the raw video frame 102, the video processing engine 106 determines the positions of facial landmarks on the face. The facial landmarks may include one or more of, e.g., the leftmost- and rightmost-points of each of the eyes and mouth, the topmost- and bottommost-points of each of the eyes and the mouth, and the tip of the nose. The video processing engine 106 may determine the positions of the facial landmarks, e.g., by processing the portion of the raw video frame 102 depicting the face using a landmark detection model (e.g., neural network) to generate data defining the positions of the facial landmarks.

Optionally, the video processing engine 106 can smooth the positions of the facial landmarks in each raw video frame based on the positions of the corresponding facial landmarks in the other raw video frames, e.g., using a temporal Gaussian kernel.

After determining the positions of the facial landmarks, the video processing engine 106 can determine the parameter values of an "alignment" transformation that, when applied to the raw video frame, causes the face in the raw video frame to be depicted from a canonical point of view. More specifically, the video processing engine 106 can determine an alignment transformation that, when applied to the raw video frame, approximately (or exactly) aligns the positions of the facial landmarks in the raw video frame with a set of reference facial landmark positions. The alignment transformation may be, e.g., an affine transformation or an elastic transformation. The video processing engine 106 can determine the parameter values of the alignment transformation using any appropriate optimization procedure, for example, a gradient descent optimization procedure.

The video processing engine 106 can generate the lip video frame 112 corresponding to the raw video frame 102 by applying the alignment transformation to the raw video frame, and then cropping a portion of the raw video frame that depicts at least the lips of the person. The video processing engine 106 can identify the position of the lips of the person in the raw video frame, e.g., based on the positions of the facial landmarks corresponding to the lips. In addition to depicting the lips of the person, the lip video frame 112 may depict, e.g., a portion of the face of the person around the lips, or the entire face of the person.

The VSR network 108 is configured to process the sequence of lip video frames 112 to generate a sequence of "phoneme distributions" 114. The sequence of phoneme distributions 114 includes a respective phoneme distribution corresponding to each lip video frame 112. Each phoneme distribution defines a respective score for each phoneme in a vocabulary of possible phonemes. For example, each phoneme distribution may include a respective score corresponding to each phoneme in the vocabulary of possible phonemes.

The score for a given phoneme that is defined by a phoneme distribution corresponding to a lip video frame 112 characterizes a likelihood that the lip video frame 112 captures the person pronouncing the given phoneme. For example, the score may be a probability value (i.e., a numerical value between 0 and 1) that defines a probability that the lip video frame 112 captures the person pronouncing the given phoneme.

The vocabulary of possible phonemes includes a predetermined number (e.g., 40) of possible phonemes. The possible phonemes may include a "blank" symbol that corresponds to silence (e.g., in a pause in speech).

An example architecture of the VSR network 108 is described in more detail with reference to FIG. 2 and FIG. 3.

The decoding engine 110 is configured to process the sequence of phoneme distributions 114 to generate data defining the sequence of words 104 corresponding to the movement of the lips depicted in the lip video frames 112. The decoding engine 110 can use any of a variety of decoding techniques to generate the sequence of words 104 from the sequence of phoneme distributions 114. An example decoding engine 110 is described in more detail with reference to FIG. 2.

Figure 2:
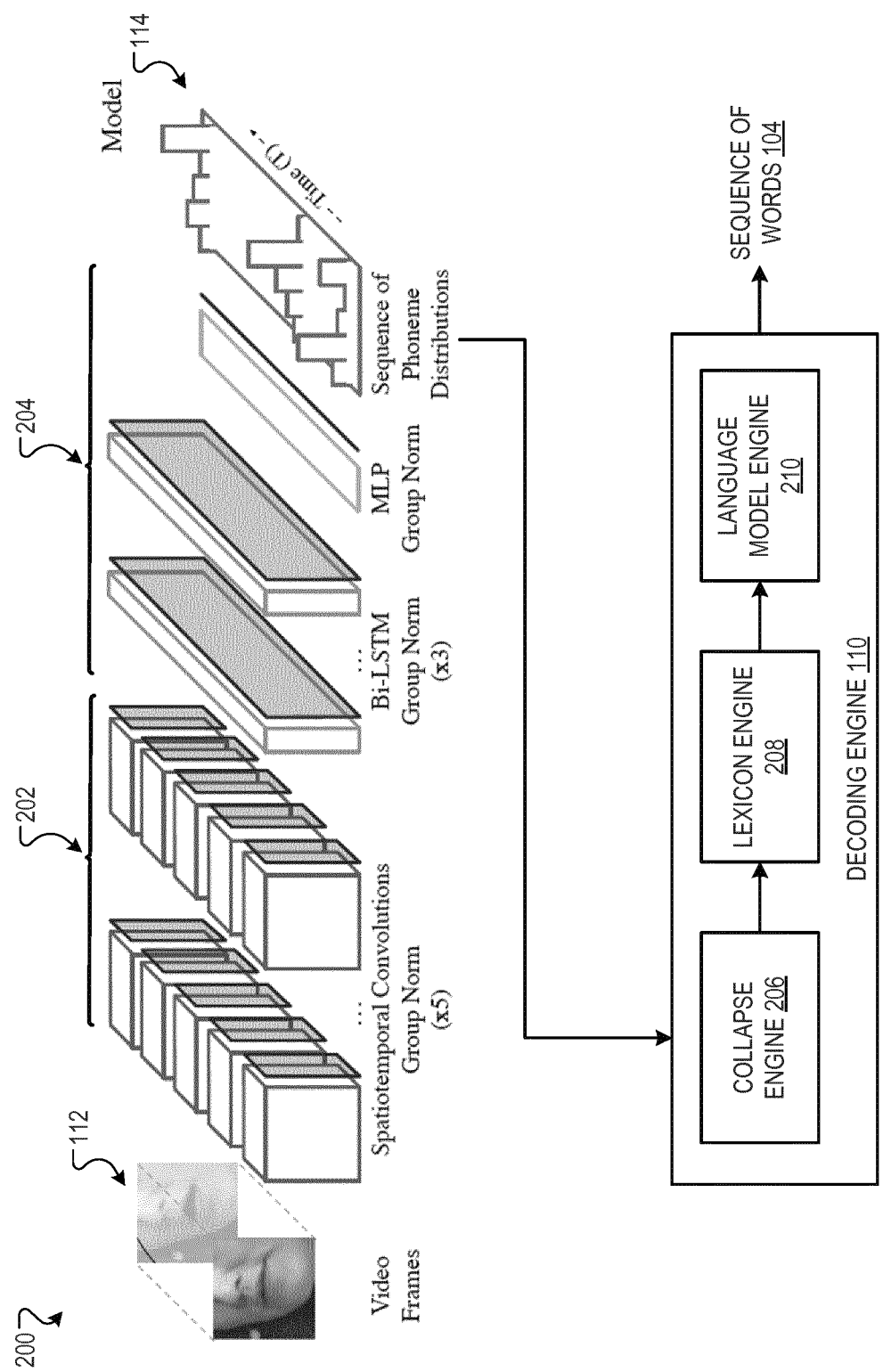
FIG. 2 is an illustration of an example architecture of a visual speech recognition neural network and a decoding engine.

FIG. 2 is an illustration 200 of an example architecture of a VSR network and a decoding engine, e.g., the VSR network 108 and the decoding engine 110 described with reference to FIG. 1.

The VSR network illustrated by FIG. 2 has a three-dimensional (3D) convolutional module 202 for extracting spatiotemporal features from the lip video frames 112 and a temporal module 204 for aggregating the spatiotemporal features over time to generate the sequence of phoneme distributions 114. Spatiotemporal features refer to features that integrate "spatial information" from within lip video frames and "temporal" information from across lip video frames.

The 3D convolutional module 202 has a sequence of five volumetric convolutional neural network layers ("spatiotemporal convolution layers") that each generate respective spatiotemporal features. A volumetric convolutional layer refers to a convolutional layer having three-dimensional (3D) convolutional filters. The 3D convolutional filters cause the neurons of the volumetric convolutional neural network layers to have receptive fields that extend both within and between lip video frames. Therefore, 3D convolutional filters enable volumetric convolutional neural network layers to generate spatiotemporal features which can characterize both lip shape within video frames and lip movement across video frames. The receptive field of the volumetric convolutional neural network layers may more than the typical duration of a phoneme, e.g. around twice this.

In addition to the volumetric convolutional neural network layers, the 3D convolutional module 202 includes a respective pooling layer and group normalization layer after each of the volumetric convolutional layers. A group normalization layer divides its input into groups of channels and computes normalization statistics within these groups (i.e., rather than along the batch dimension, as in batch normalization). The normalization statistics may comprise a mean $\mu$ and/or standard deviation $\sigma$ or variance $\sigma^2$; normalization may comprise computing $\hat{x}=x-\mu$ or $\hat{x}=x-\mu/\sigma$.

The VSR network provides the output of the 3D convolutional module 202, which includes a respective spatiotemporal feature vector corresponding to each of the lip video frames 112, to the temporal module 204. The temporal module 204 has a sequence of three bi-directional long short-term memory (LSTM) neural network layers and a multi-layer perceptron (MLP).

The first bi-directional LSTM layer processes the sequence of spatio-temporal feature vectors output by the 3D convolutional module 202 to generate a respective aggregated feature vector corresponding to each of the video frames 112. The second and third bi-directional LSTM layers process the sequence of aggregated feature vectors generated by the first and second bi-directional LSTM layers respectively.

The MLP includes two fully-connected layers and a soft-max layer that are configured to process the aggregated feature vectors generated by the third bi-directional LSTM layer to generate an output that defines the sequence of phoneme distributions 114. The sequence of phoneme distributions includes a respective phoneme distribution corresponding to each lip video frame 112.

In addition to the bi-directional LSTM layers and the MLP, the temporal module 204 includes a respective group normalization layer after each of the bi-directional LSTM layers and the MLP.

The decoding engine 110 processes the sequence of phoneme distributions 114 to generate the sequence of words 104 corresponding to the movement of the lips in the lip video frames 112. In the example illustrated by FIG. 2, the decoding engine 110 includes a collapse engine 206 (sometimes called a collapse finite state transducer), a lexicon engine 208 (sometimes called a lexicon finite state transducer), and a language model engine 210 (sometimes called a language model finite state transducer).

The collapse engine 206 is configured to process a sequence of phonemes to remove duplicate phonemes and blank symbols.

The lexicon engine 208 is configured to map the processed sequence of phonemes generated by the collapse engine 206 to a corresponding sequence of words (e.g., using a predetermined mapping from phonemes to words).

The language model engine 210 is configured to process the sequence of words generated by the lexicon engine 208 to determine a likelihood that the sequence of words represents a valid phrase in a given natural language (e.g., English). In one example, the language model engine 210 may implement an n-gram language model with Katz back-off.

The decoding engine 110 uses the collapse engine 206, the lexicon engine 208, and the language model engine 210 to perform a search (e.g., a beam search) over possible sequences of words corresponding to the movement of the lips in the lip video frames 112. The decoding engine 110 can perform the search by determining, for each of multiple possible sequences of words, a likelihood that the sequence of words corresponds to the movement of the lips in the video frames 112. The likelihood of each sequence of words can be determined based on (e.g., the product of): (i) the likelihood of the sequence of phonemes corresponding to the sequence of words according to the sequence of phoneme distributions 114, and (ii) the likelihood of the sequence of words according to the language model engine 210.

An example of the operations that can be performed by the decoding engine 110 is described in more detail with reference to, e.g., M. Mohri, F. Pereira, and M. Riley: "Weighted finite-state transducers in speech recognition", in *Computer Speech & Language*, 16(1), pp. 69-88 (2002), or Y. Miao, M. Gowayyed, and F. Metze: "Eesen: end-to-end speech recognition using deep RNN models and WFST-based decoding", in *Workshop on Automatic Speech Recognition and Understanding*, pp. 167-174, IEEE, 2015.

As one of example of the performance gains that can be achieved by performing visual speech recognition using the described systems, the VSR network and decoding engine described with reference to FIG. 2 can achieve a phoneme error rate of 33.6±0.6, a character error rate of 28.3±0.9, and a word error rate of 40.9±1.2 on a particular test set of video frames. In contrast, a professional lip reader achieved a word error rate of 92.9±0.9 on the same set of video frames.

FIG. 3 shows an example of: (i) the filter sizes and strides corresponding to the volumetric convolutional layers ("conv1" to "conv5") and pooling layers ("pool1" to "pool5") of the example VSR network illustrated by FIG. 2, and (ii) the dimensionality of the output channels and the input of the volumetric convolutional layers, the pooling layers, the bi-directional LSTM layers ("bilstm6" to "bilstm8"), and the fully-connected layers ("fc9" to "fc10") of the example VSR network illustrated by FIG. 2.

Figure 4:
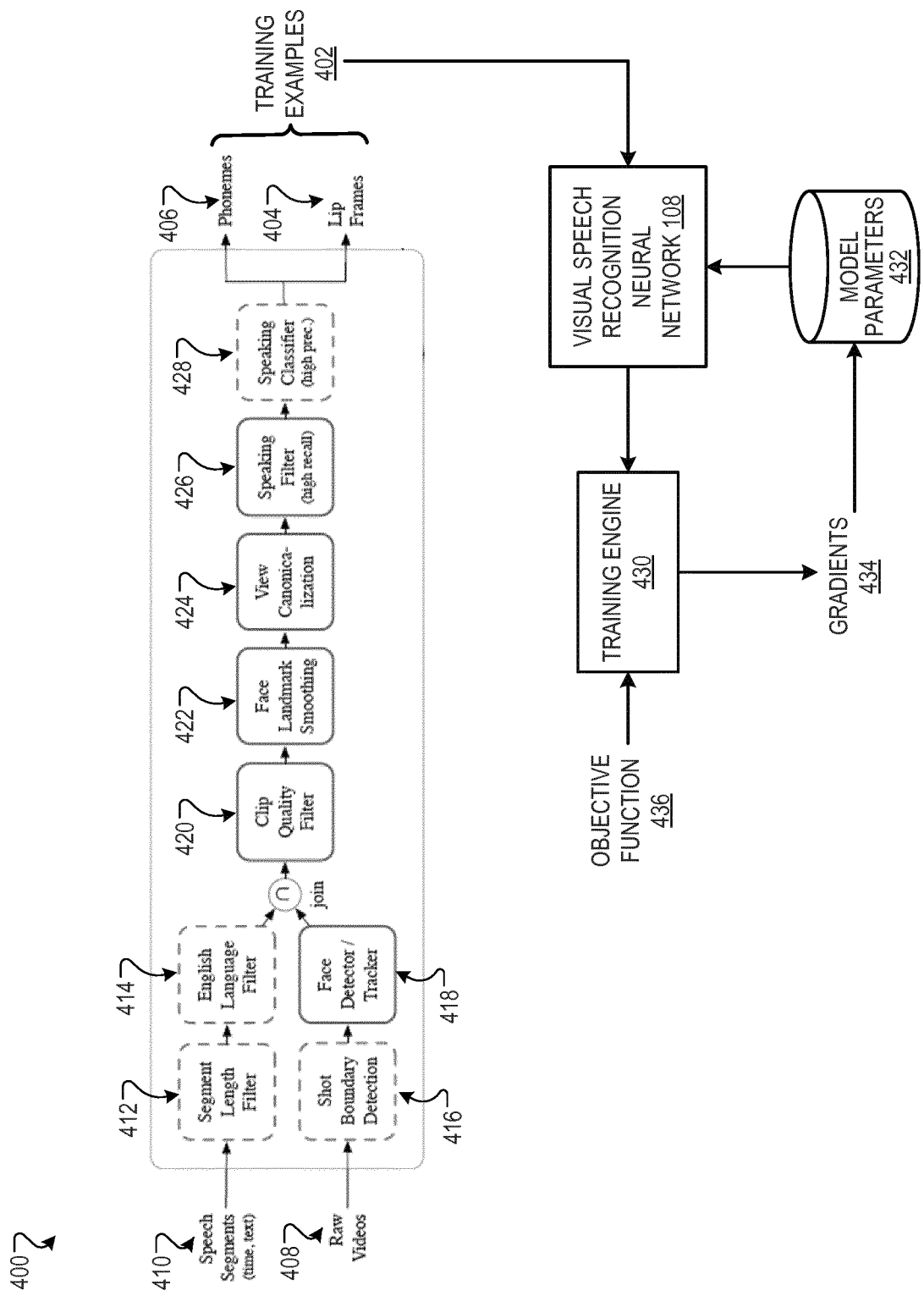
FIG. 4 shows an example of a data flow for training a visual speech recognition neural network.

FIG. 4 shows an example of a data flow 400 for training the VSR network 108 described with reference to FIG. 1. The VSR network 108 is trained on a set of training data composed of multiple training examples 402. Each training example 402 includes: (i) a sequence of lip video frames 404 depicting the lips of a person (i.e, a training video that includes multiple training frames), and (ii) a sequence of phonemes 406 from a vocabulary of possible phonemes that corresponds to the movement of the lips depicted in the lip video frames 404. Some or all of the same video processing steps may be used to pre-process raw video for use with a trained model (omitting the dashed components whose primary use is producing paired training data).

To generate the training examples 402, a set of raw videos 408 and corresponding speech segments 410 (audio data) is obtained, e.g., extracted from videos available on a video-sharing website.

The segment length filter 412 identifies and removes videos with a duration that falls outside of a predetermined range (e.g., 1 second-12 seconds).

The English language filter 414 identifies and removes videos with speech that is not expressed in English. To identify the language of the speech expressed in a video, the filter 414 can process a transcript of the speech (e.g., generated using automatic speech recognition techniques) using a language classifier. To train the VSR network 108 to perform visual speech recognition in a given language other than English, the filter 414 could identify and remove videos with speech that is not expressed in the given language.

The shot boundary detection filter 416 identifies and removes videos that include a shot transition, e.g., using a thresholding color histogram classifier. A shot transition in a video refers to a frame where the viewpoint of the video abruptly changes (e.g., when the video jumps from depicting the face of one person to depicting the face of another person).

The face detector/tracker 418 detects and tracks faces depicted in each remaining video that was not filtered by the segment length filter 412, the English language filter 414, or the shot boundary detection filter 416 (e.g., using a FaceNet neural network).

The clip quality filter 420 identifies and removes videos that fail to satisfy one or more quality criteria (i.e., where a quality measure of the raw video is below a minimum threshold). For example, the clip quality filter 420 may identify and remove videos that are blurry or shaky, videos where an eye-to-eye width of the depicted face is less than a predetermined number of pixels (i.e., where the face is too small), or videos with a frame rate that is less than a predetermined minimum frame rate.

The face landmark smoothing engine 422 processes each video to identify multiple facial landmarks in the face depicted in each video frame of the video and smooths the resulting facial landmark positions using a temporal Gaussian kernel (e.g., as described with reference to FIG. 1).

Variations in the orientation (e.g., yaw and pitch) of the face in each video can be determined from the facial landmarks, and videos where variations in the orientation of the face exceed an acceptable range (e.g., ±30°) may be identified and removed.

The view canonicalization engine 424 processes each video frame of each video to determine a canonical (i.e., standardized) view of the face depicted in the video frame using the facial landmarks. For example, the view canonicalization engine 424 may apply a respective affine transformation to each video frame that approximately (or exactly) aligns the positions of the facial landmarks in the video frame with a set of reference facial landmark positions (e.g., as described with reference to FIG. 1). After determining the canonical view of the face depicted in each video frame (e.g., by applying the affine transformation to the video frame), the view canonicalization engine 424 crops a region depicting the lips from the video frame (i.e., to generate lip video frames).

The speaking filter 426 identifies and removes videos where the face depicted in the video is not speaking. To identify whether the face depicted in a video is speaking, the speaking filter 426 computes a measure of mouth openness in each video frame of the video and normalizes the mouth openness measure by the size of a bounding box around the face. The speaking filter then determines a measure of dispersion (e.g., standard deviation) of the mouth openness measures and identifies the face as speaking only if the measure of dispersion satisfies a predetermined threshold. The speaking filter 426 may determine the measure of mouth openness in a video frame to be the number of pixels separating the facial landmarks indicating the topmost- and bottommost-points of the mouth.

The speaking classifier engine 428 identifies and removes videos where the speech segment 410 is not aligned (i.e., synchronized) with the video frames. To identify videos where the speech segment is not aligned with the video frames, the speaking classifier engine 428 can generate an embedding of the video frames and an embedding of the corresponding speech segment. The speaking classifier engine 428 can generate the embedding of the video frames by processing the video frames using a video embedding neural network (e.g., that can include or more volumetric convolutional layers). The speaking classifier engine 428 can generate the embeddings of the speech segment by processing a log mel-spectrogram representation of the speech segment using an audio embedding neural network. After generating the video embedding and the audio embedding, the speaking classifier engine 428 may identify the video frames as being aligned with the speech segment only if a similarity measure between the respective embeddings meets a predetermined threshold value. The similarity measure may be, e.g., a Euclidean similarity measure or a cosine similarity measure.

The video embedding neural network and the audio embedding neural network used by the speaking classifier engine 428 may be jointly trained to generate similar (i.e., according to a similarity measure) embeddings of a video and a speech segment if and only if the video and the speech segment are synchronized.

An "embedding" of a video or an audio segment refers to an ordered collection of numerical values (e.g., a vector or matrix of numerical values) representing the video or audio segment.

The sequence of phonemes 406 corresponding to a sequence of lip frames 404 can be determined in any of a variety of ways. In one example, an automatic speech recognition process can be used to determine an approximate transcript of the speech segment 410 corresponding to the lip frames 404. The approximate transcript generated by the automatic speech recognition process can be used to align an actual transcript of the speech segment (e.g., generated by a person) with the video and the corresponding speech segment (audio data). Thereafter, the actual transcript can be mapped to a sequence of phonemes 406 (e.g., in accordance with a predetermined mapping from words to phonemes) having the same alignment with the video as the actual transcript.

A training engine 430 can use the training examples 402 to train the VSR network 108, that is, to determine trained values of the model parameters 432 of the VSR network 108 from initial values of the model parameters 432 of the VSR network 108.

The training engine 430 trains the VSR network 108 over multiple training iterations. At each training iteration, the training engine 430 samples a current "batch" (i.e., set) of multiple training examples.

For each training example in the current batch, the training engine 430 uses the VSR network 108 to process the sequences of lip frames included in the training example to generate a corresponding sequence of phoneme distributions. The training engine 430 then determines gradients 434 of an objective function 436, and uses the gradients 434 to adjust the current values of the model parameters 432. The objective function 436 depends on: (i) the sequence of phoneme distributions generated by the VSR network 108 for the sequence of lip frames in the training example, and (ii) the sequence of phonemes included in the training example.

The training engine 430 can determine the gradients of the objective function 436 using, e.g., backpropagation techniques. The training engine 430 can use the update rule of any of a variety of gradient descent optimization procedures (e.g., an RMSprop or Adam optimization procedure) to update the current values of the model parameters 432 using the gradients 434.

The objective function 436 may be, e.g., a connectionist temporal classification (CTC) objective function (e.g. Graves et al. "Connectionist temporal classification: Labelling unsegmented sequence data with recurrent neural networks" *ICML* 2006: 369-376). The CTC objective function measures the likelihood of the sequence of phonemes included in a training example according to the sequence of phoneme distributions generated by the VSR network 108 for the training example, without requiring the alignment of the sequence of phonemes and the sequence of phoneme distributions.

The objective function 436 may also be, e.g., a neural transducer loss objective function (e.g., as described in section 2.5 of A. Graves: "Sequence transduction with recurrent neural networks", arXiv:1211.3711v1 (2012)).

The training engine 430 can continue training the VSR network 108 until a training termination criterion is satisfied, e.g., until a predetermined number of training iterations have been performed, or until an accuracy of the VSR network 108 achieves a predetermined threshold.

Figure 5:
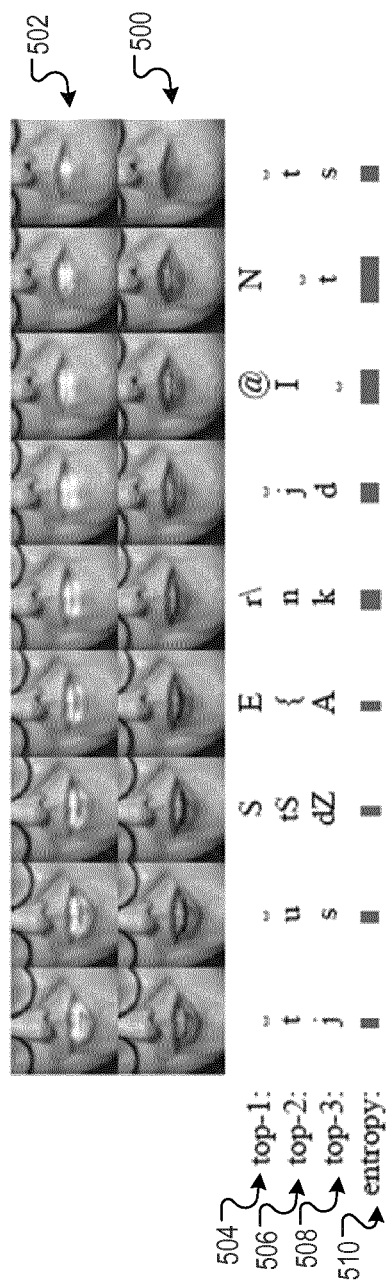
FIG. 5 illustrates the results of processing a few example sequences of lip frames using a visual speech recognition neural network with the example architecture.

FIG. 5 illustrates the results of processing an example sequence of lip frames 500 using a VSR network with the architecture described with reference to FIG. 2. 502 illustrates the lip frames 500 being overlaid with a saliency map, where pixels with a lighter color are determined to be more important to the prediction generated by the VSR network than pixels with a color that is less light. For each lip frame, "top-1" 504, "top-2" 506, and "top-3" 508 indicate the three phonemes associated with the highest scores by the phoneme distribution corresponding to the lip frame, and "entropy" 510 indicates the entropy of the phoneme distribution corresponding to the lip frame (where the magnitude of the entropy is illustrated by the length of a corresponding bar).

Figure 6:
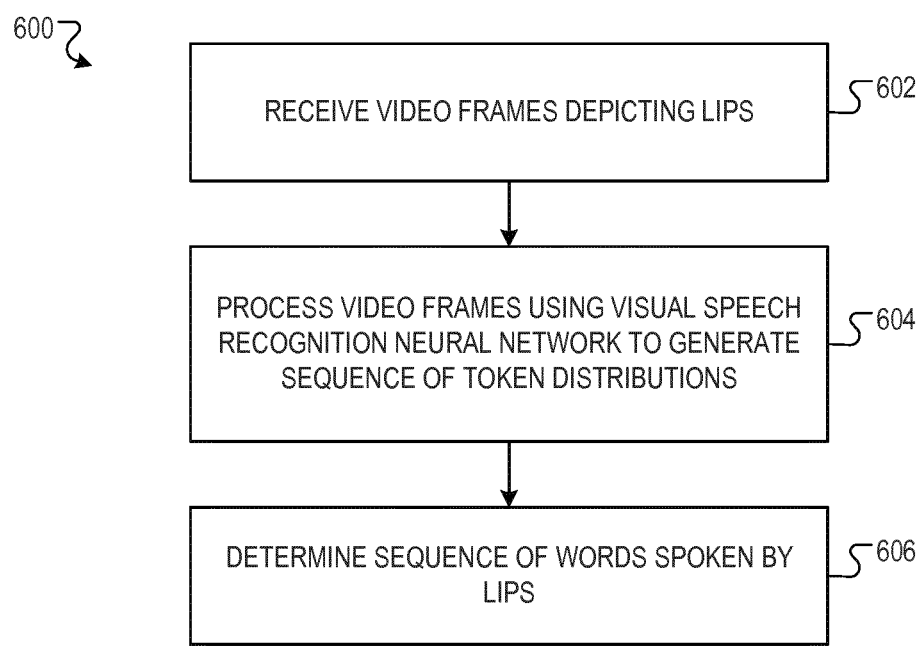
FIG. 6 is a flow diagram of an example process for performing visual speech recognition.

FIG. 6 is a flow diagram of an example process 600 for performing visual speech recognition. For convenience, the process 600 will be described as being performed by a system of one or more computers located in one or more locations. For example, a visual speech recognition system, e.g., the visual speech recognition system 100 of FIG. 1, appropriately programmed in accordance with this specification, can perform the process 600.

The system receives a video having multiple video frames, where each video frame depicts a pair of lips of a person (602). The system may process each video frame by applying an alignment transformation to the video frame that causes the lips and face in the video frame to be depicted from a canonical (i.e., standardized) point of view, and then cropping a region around the lips from the video frame.

The system processes the video using the VSR network to generate, for each output position in an output sequence, a respective output score for each token in a vocabulary of possible tokens (604). Each position in the output sequence corresponds to a respective video frame. The output scores for each token in the vocabulary of possible tokens at an output position can be referred to as a "token distribution". The tokens may be, e.g., phonemes (as described earlier), characters, word pieces, or whole words. The score for a given token at a given output position in the output sequence characterizes a likelihood that the video frame corresponding to the given output position captures the person pronouncing the given token. The VSR network includes one or more volumetric convolutional neural network layers (i.e., that each have 3D convolutional filters) and one or more "time-aggregation" neural network layers (e.g., recurrent layers). In some implementations, the VSR network includes at least five volumetric convolutional layers.

The system determines a sequence of words spoken by the pair of lips depicted in the video using the scores (i.e., token distributions) generated by the VSR network (606). For example, the system can process the token distributions generated by the VSR network using a decoder, e.g., the decoding engine described with reference to FIG. 2.

A device implementing a system as described herein, e.g. a mobile phone, may require biometric authentication to unlock the device before use. In some implementations, e.g. where the VSR network is running on a server, the system may apply face-based authentication to the received video for further access control.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for visual speech recognition, the method comprising:
   receiving a video comprising a plurality of video frames, wherein each video frame depicts a pair of lips;
   processing the video using a visual speech recognition neural network in accordance with current values of visual speech recognition neural network parameters to generate, for each output position in an output sequence, a respective output score for each token in a vocabulary of possible tokens,
   wherein the visual speech recognition neural network comprises: (i) a three-dimensional (3D) convolutional subnetwork comprising a sequence of multiple volumetric convolutional neural network layers, and (ii) a temporal subnetwork;
   wherein the 3D convolutional subnetwork processes the plurality of video frames depicting the pair of lips using a plurality of three-dimensional (3D) convolutional filters of the sequence of multiple volumetric convolutional neural network layers to generate a respective spatio-temporal feature tensor for each video frame of the plurality of video frames depicting the pair of lips;
   wherein the temporal subnetwork processes the spatio-temporal feature tensors corresponding to the video frames depicting the pair of lips to generate, for each output position in the output sequence, the respective output score for each token in the vocabulary of possible tokens;
   wherein the vocabulary of possible tokens comprises a plurality of phonemes; and
   determining a sequence of words expressed by the pair of lips depicted in the video using, for each output position in the output sequence, the respective output score for each token in the vocabulary of possible tokens.

2. The method of claim 1 wherein determining the sequence of words comprises predicting a sequence of phoneme distributions and providing the sequence of phoneme distributions to a decoder to produce the sequence of words.

3. The method of claim 1, wherein the temporal subnetwork comprises one or more recurrent neural network layers.

4. The method of claim 3, wherein the recurrent neural network layers comprise one or more long short-term memory neural network layers.

5. The method of claim 4, wherein one or more of the long short-term memory neural network layers are bi-directional long short-term memory neural network layers.

6. The method of claim 1, wherein the visual speech recognition neural network comprises one or more group normalization layers.

7. The method of claim 1, wherein determining the sequence of words expressed by the pair of lips depicted in the video comprises processing, for each output position in the output sequence, the respective output score for each token in the vocabulary of possible tokens using a decoder to generate the sequence of words.

8. The method of claim 7, wherein the decoder comprises a finite state transducer.

9. The method of claim 8, wherein the decoder performs operations comprising:
   removing duplicate phonemes and blanks; and
   mapping phonemes to words, comprising using a language model.

10. The method of claim 9, wherein the language model is an n-gram language model with backoff.

11. The method of claim 1, wherein the visual speech recognition neural network includes at least five volumetric convolutional neural network layers.

12. The method of claim 1, further comprising training the visual speech recognition neural network, the training comprising:
   generating training data comprising a plurality of training examples, each training example comprising: (i) a training video comprising a plurality of training video frames, and (ii) a sequence of phonemes from a vocabulary of possible phonemes, the generating comprising, for each training video:
      obtaining a raw video comprising a plurality of raw video frames and corresponding audio data;

determining the sequence of phonemes from the vocabulary of possible phonemes using the audio data; and determining each training video frame based on a face depicted in a respective raw video frame;

training the visual speech recognition neural network on the generated training data, comprising determining trained values of visual speech recognition neural network parameters from initial values of visual speech recognition neural network parameters.

13. The method of claim 12, wherein determining the sequence of phonemes from the vocabulary of possible phonemes using the audio data comprises:

obtaining a transcript of the raw video;

determining an alignment of the transcript and the audio data using a trained automatic speech recognition algorithm; and determining the sequence of phonemes from the aligned transcript.

14. The method of claim 13, further comprising determining the transcript is expressed in a specific natural language.

15. The method of claim 12, further comprising determining that a quality measure of the raw video exceeds a minimum threshold.

16. The method of claim 12, wherein determining a training video frame based on a face depicted in a respective raw video frame comprises:

detecting the face in the raw video frame;

determining a plurality of landmarks on the face;

determining a canonical view of the face using the landmarks; and cropping a region depicting a pair of lips from the canonical view of the face.

17. The method of claim 16, further comprising smoothing the plurality of landmarks on the face.

18. A system comprising one or more computers and one or more storage devices storing instructions that when executed by the one or more computers cause the one or more computers to perform operations for visual speech recognition, the operations comprising:

receiving a video comprising a plurality of video frames, wherein each video frame depicts a pair of lips;

processing the video using a visual speech recognition neural network in accordance with current values of visual speech recognition neural network parameters to generate, for each output position in an output sequence, a respective output score for each token in a vocabulary of possible tokens, wherein the visual speech recognition neural network comprises: (i) a three-dimensional (3D) convolutional subnetwork comprising a sequence of multiple volumetric convolutional neural network layers, and (ii) a temporal subnetwork;

wherein the 3D convolutional subnetwork processes the plurality of video frames depicting the pair of lips using a plurality of three-dimensional (3D) convolutional filters of the sequence of multiple volumetric convolutional neural network layers to generate a respective spatio-temporal feature tensor for each video frame of the plurality of video frames depicting the pair of lips;

wherein the temporal subnetwork processes the spatio-temporal feature tensors corresponding to the video frames depicting the pair of lips to generate, for each output position in the output sequence, the respective output score for each token in the vocabulary of possible tokens;

wherein the vocabulary of possible tokens comprises a plurality of phonemes; and determining a sequence of words expressed by the pair of lips depicted in the video using, for each output position in the output sequence, the respective output score for each token in the vocabulary of possible tokens.

19. One or more non-transitory computer storage media storing instructions that when executed by one or more computers cause the one or more computers to perform operations for visual speech recognition, the operations comprising:

receiving a video comprising a plurality of video frames, wherein each video frame depicts a pair of lips;

processing the video using a visual speech recognition neural network in accordance with current values of visual speech recognition neural network parameters to generate, for each output position in an output sequence, a respective output score for each token in a vocabulary of possible tokens, wherein the visual speech recognition neural network comprises: (i) a three-dimensional (3D) convolutional subnetwork comprising a sequence of multiple volumetric convolutional neural network layers, and (ii) a temporal subnetwork;

wherein the 3D convolutional subnetwork processes the plurality of video frames depicting the pair of lips using a plurality of three-dimensional (3D) convolutional filters of the sequence of multiple volumetric convolutional neural network layers to generate a respective spatio-temporal feature tensor for each video frame of the plurality of video frames depicting the pair of lips;

wherein the temporal subnetwork processes the spatio-temporal feature tensors corresponding to the video frames depicting the pair of lips to generate, for each output position in the output sequence, the respective output score for each token in the vocabulary of possible tokens;

wherein the vocabulary of possible tokens comprises a plurality of phonemes; and determining a sequence of words expressed by the pair of lips depicted in the video using, for each output position in the output sequence, the respective output score for each token in the vocabulary of possible tokens.

20. The non-transitory computer storage media of claim 19, wherein determining the sequence of words comprises predicting a sequence of phoneme distributions and providing the sequence of phoneme distributions to a decoder to produce the sequence of words.

* * * * *